United States Patent
Kimura (10) Patent No.: US 7,365,764 B2
(45) Date of Patent: Apr. 29, 2008

(54) SCANNING OPTICAL APPARATUS AND COLOR IMAGE FORMING APPARATUS USING THE SAME

(75) Inventor: Kazumi Kimura, Toda (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/285,066

(22) Filed: Nov. 23, 2005

(65) Prior Publication Data

US 2006/0072002 A1    Apr. 6, 2006

Related U.S. Application Data

(62) Division of application No. 09/694,502, filed on Oct. 24, 2000, now Pat. No. 7,015,940.

(30) Foreign Application Priority Data

Oct. 28, 1999 (JP) .................................. 11-306814

(51) Int. Cl.
  B41J 2/435 (2006.01)
  B41J 2/47 (2006.01)
(52) U.S. Cl. ....................................... 347/250; 347/235
(58) Field of Classification Search ........ 347/233–235, 347/241–245, 248–250, 256–261, 137, 231, 347/116; 250/236; 358/509, 302; 359/204, 359/196, 200, 212, 216–221
  See application file for complete search history.

(56) References Cited

U.S. PATENT DOCUMENTS

| 4,833,489 A | * | 5/1989 | Byung-Sik | .................. 347/261 |
| 4,841,135 A | * | 6/1989 | Goto et al. | .................. 359/218 |
| 4,937,664 A | | 6/1990 | Chiku et al. | ................. 358/526 |
| 5,043,744 A | * | 8/1991 | Fantuzzo et al. | ........... 347/250 |
| 5,072,244 A | | 12/1991 | Aoki et al. | ................. 346/160 |
| 5,115,256 A | | 5/1992 | Miyagi et al. | ............... 346/108 |
| 5,138,479 A | | 8/1992 | Ando | ......................... 359/216 |
| 5,365,259 A | * | 11/1994 | Kanoto et al. | ............... 347/137 |
| 5,486,694 A | * | 1/1996 | Harris | ........................ 250/236 |
| 5,497,184 A | * | 3/1996 | Saito et al. | .................. 347/257 |
| 5,561,743 A | | 10/1996 | Kanai et al. | ................. 395/107 |

(Continued)

FOREIGN PATENT DOCUMENTS

EP    319241    6/1989

(Continued)

*Primary Examiner*—Hai C Pham
(74) *Attorney, Agent, or Firm*—Fitzpatrick, Cella, Harper & Scinto (57) ABSTRACT

A scanning optical apparatus includes a light source capable of being modulated, a deflecting element for deflecting and scanning a beam emitted from the light source, a scanning optical element for imaging the deflected beam into a spot shape on a scanned surface, and an optical element for synchronous detection for directing the deflected beam from the deflecting element to a sensor to take the timing of image writing beginning. The scanning optical apparatus further inclueds a scanning position detecting device for making the optical axis of the optical element for synchronous detection and the principal ray of the beam from the deflecting element for taking the timing of image writing beginning coincident with each other, and detecting the position of the beam at a point having at least one image height separate from the optical axis of the scanning optical element.

4 Claims, 7 Drawing Sheets

U.S. PATENT DOCUMENTS

| | | | | |
|---|---|---|---|---|
| 5,570,195 | A | * 10/1996 | Honbo | 358/302 |
| 5,610,651 | A | 3/1997 | Yamakawa et al. | 347/250 |
| 5,715,498 | A | 2/1998 | Takeuchi et al. | 399/40 |
| 5,889,594 | A | 3/1999 | Maekawa | 358/296 |
| 5,933,184 | A | * 8/1999 | Ishigami et al. | 347/249 |
| 5,952,650 | A | 9/1999 | Uzuki | 250/235 |
| 5,963,356 | A | 10/1999 | Kato | 359/216 |
| 5,966,232 | A | 10/1999 | Kimura et al. | 359/205 |
| 6,046,835 | A | 4/2000 | Yamawaki et al. | 359/205 |
| 6,108,115 | A | 8/2000 | Kimura et al. | 359/205 |
| 6,172,786 | B1 | * 1/2001 | Fujita et al. | 359/200 |
| 6,320,682 | B1 | * 11/2001 | Azumai et al. | 358/509 |
| 6,342,963 | B1 | * 1/2002 | Yoshino | 359/204 |
| 6,366,385 | B2 | 4/2002 | Kimura et al. | 359/204 |
| 6,452,687 | B1 | 9/2002 | Suzuki et al. | 358/1.1 |
| 6,459,520 | B1 | * 10/2002 | Takayama | 359/204 |
| 6,822,666 | B2 | 11/2004 | Kato | 347/235 |

FOREIGN PATENT DOCUMENTS

| | | |
|---|---|---|
| EP | 343995 | 11/1989 |
| EP | 478005 | 4/1992 |
| EP | 666685 | 8/1995 |
| EP | 676658 | 10/1995 |
| EP | 827004 | 3/1998 |
| JP | 3-110512 | 5/1991 |
| JP | 8-244278 | 9/1996 |
| JP | 8-271819 | 10/1996 |
| JP | 10-142542 | 5/1998 |

\* cited by examiner

○ IMAGE FORMATION POINT OF BLACK
◉ IMAGE FORMATION POINT OF CYAN

FIG. 9

SCANNING OPTICAL APPARATUS AND COLOR IMAGE FORMING APPARATUS USING THE SAME

This application is a division of application Ser. No. 09/694,502, filed Oct. 24, 2000, the contents of which are incorporated herein by reference.

BACKGROUND OF THE INVENTION

1. Field of the Invention

This invention relates to a scanning optical apparatus and an image forming apparatus using the same, and chiefly to an image forming apparatus such as a laser beam printer or a digital copier having the electrophotographic process adapted to deflect a beam emitted from light source means by a deflecting element, and light-scan a scanned surface through an imaging element having an fθ characteristic to thereby record image information, and a scanning optical apparatus suitable for use in such apparatus.

2. Related Background Art

In the scanning optical apparatus of a laser beam printer (LBP) or the like, a beam emitted from light source means in conformity with an image signal is light-modulated. This light-modulated beam is periodically deflected by a light deflector comprising, for example, a polygon mirror, and is converged into a spot shape on the surface of a photosensitive recording medium by an imaging optical system having an fe characteristic while its distortion is corrected, and that surface is light-scanned to thereby effect image recording.

Figure 6:
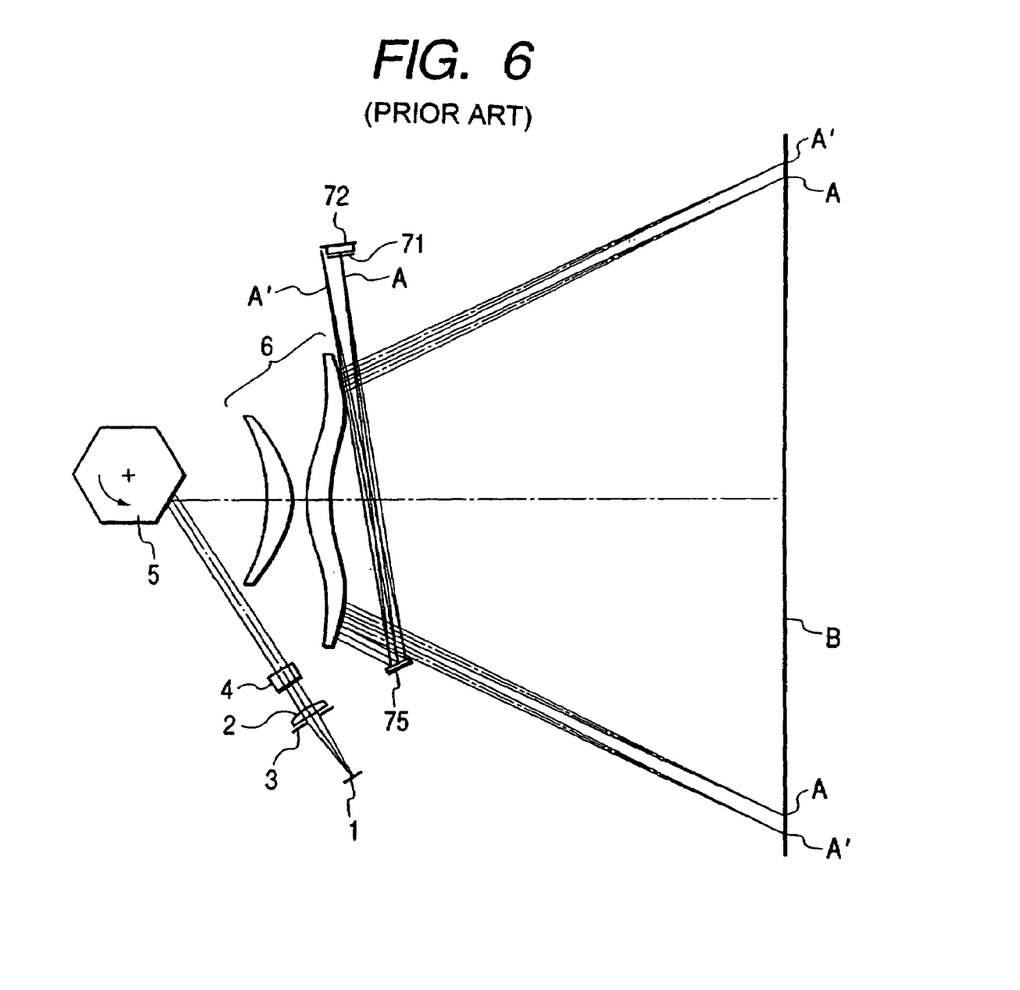
FIG. 6 is a cross-sectional view of a scanning optical apparatus according to the prior art in the main scanning direction.

FIG. 6 of the accompanying drawings is a schematic view of a scanning optical apparatus according to the prior art. In FIG. 6, a divergent beam emitted from light source means 1 to which an image signal modulated by modulating means has been inputted is made into a substantially parallel light by a collimator lens 2, and enters a cylinder lens 4 with the cross-sectional shape of the beam limited by an aperture stop 3. That portion of the parallel beam having entered the cylinder lens 4 which is in the main scanning surface emerges in its state as it is. Also, in the sub-scanning surface, the beam converges and is formed substantially as a linear image on the reflecting surface of a light deflector 5 comprising a polygon mirror. The beam reflected and deflected by the reflecting surface of the light deflector 5 is directed to a scanned surface 8 through two scanning optical elements (fθ lenses) 6 having an fθ characteristic. The light deflector 5 is then rotated in the direction of arrow, whereby the scanned surface 8 is scanned in the main scanning direction and is scanned in the sub-scanning direction by the next reflecting surface of the light deflector 5. A part of the beam deflected by the light deflector 5 is reflected by a reflecting mirror 75 through the scanning optical elements 6 and is directed to a slit 71 and a sensor 72, and is synchronized with the writing beginning timing of an image.

Figure 7:
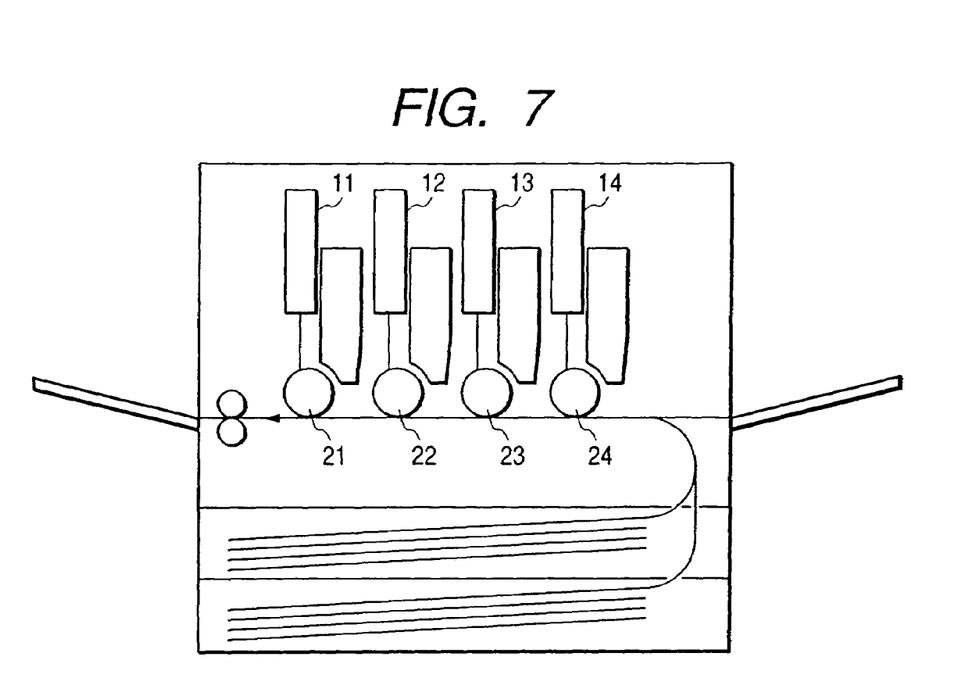
FIG. 7 is a cross-sectional view of a tandem type color image forming apparatus according to the prior art.

In recent years, with the higher resolution and lower cost of image forming apparatuses having the electrophotographic process, it has become the mainstream to manufacture the scanning optical element (fθ lens) of the aforedescribed scanning optical apparatus by plastic molding, and use an inexpensive fθ lens in which chromatic aberration of magnification is not compensated for. Also, in order to cope with high-speed color image formation, there is required a scanning optical apparatus for use in a tandem type color image forming apparatus as shown in FIG. 7 of the accompanying drawings wherein a plurality of scanning optical apparatuses 11-14 are used at a time correspondingly to four colors, e.g. Y, M, C and K to record image information of each color on each of different photo-sensitive drums 21-24.

However, in the scanning optical apparatus for forming a final image by the beams from the plurality of scanning optical apparatuses, a variation attributable to the chromatic aberration of magnification of the fθ lenses is caused in the scanning magnification among the plurality of scanning optical apparatuses by (a) the initial wavelength deviation among the laser light sources of the respective scanning optical apparatuses, (b) the wavelength deviation by the mode hopping of semiconductor laser resulting from a change in the environment, and (c) the fluctuation of the refractive index of a plastic lens by the change in the environment, and this leads to the deterioration of images. FIG. 6 of the accompanying drawings shows the image area when the wavelength of the light source of a plurality of scanning optical apparatuses has changed, and the deviation of the imaged position of a beam at a write beginning detecting position. In FIG. 6, there is shown an example in which as indicated at image formation points A and A', the deviations of the image formation points of respective lasers occur on a scanned surface 8.

Such a deviation of the imaged position on the scanned surface during the variation in the scanning magnification causes a small pixel deviation on the left end side (the lower side in FIG. 6) of the image near the detecting position because in the actual image, as shown in FIG. 6, synchronism is taken at the writing beginning position detecting position, and conversely becomes a great pixel deviation (scanning magnification deviation) on the right end side (the upper side in FIG. 6) of the image. Consequently, a pixel deviation is caused in the whole of the image printing area, and yet the magnification of the image changes.

Figure 8:
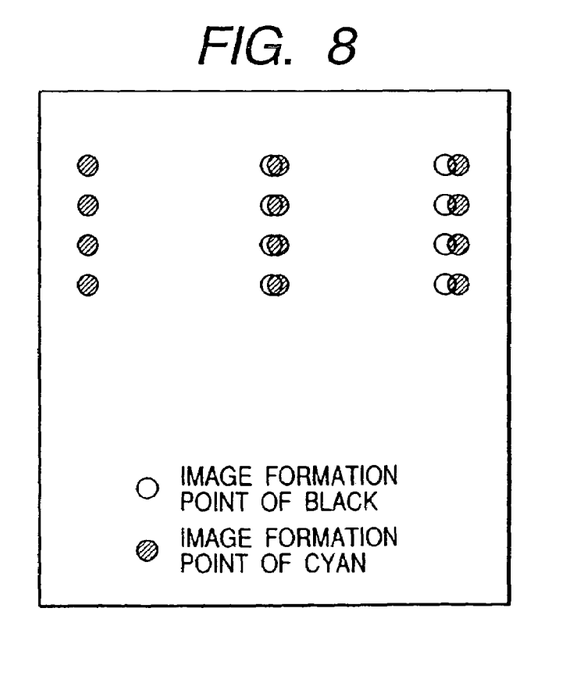
FIG. 8 is the output sample of the scanning optical apparatus according to the prior art, and shows registration deviation in the main scanning direction.

This also holds true in a scanning optical system in the tandem type color image forming apparatus, and when a change in magnification occurs among the plurality of scanning optical apparatuses, the image formation point of cyan C and the image formation point of black B coincide with each other on the left end side of the image, as shown in FIG. 8, but the registration deviation (color deviation) among respective colors becomes great on the right end side of the image, and this causes the deterioration of the image. While in FIG. 8, color deviations in B (black) and C (cyan) are shown, the same also applies in the case of the color deviation between the other colors Y (yellow) and M (magenta).

SUMMARY OF THE INVENTION

According to the present invention, there are realized a scanning optical apparatus which reduces the change in the magnification of a scanning optical system by the pixel deviation of the entire printing area in the above-described example of the prior art, or the registration deviation of the scanning optical system in a tandem type color image forming apparatus even when an inexpensive plastic molded lens in which the correction of chromatic aberration of magnification is not effected is used as a scanning optical element, and which is low in cost and easy to construct and is small in color deviation, and a color image forming apparatus using the same.

The scanning optical apparatus of the present invention comprises:

a light source capable of being modulated;

a deflecting element for deflecting and scanning a beam emitted from the light source;

a scanning optical element for imaging the deflected beam into a spot shape on a scanned surface; and an optical element for synchronous detection for directing the deflected beam from the deflecting element to a sensor to take the timing of image writing beginning; and is characterized by the provision of:

scanning position detecting means for making the optical axis of the optical element for synchronous detection and the principal ray of the beam from the deflecting element for taking the timing of image writing beginning coincident with each other, and detecting the position of the beam at a point having at least one image height separate from the optical axis of the scanning optical element.

In the scanning optical apparatus, the optical element for synchronous detection is an anamorphic lens.

In the scanning optical apparatus, the optical element for synchronous detection is made of a plastic material.

In the scanning optical apparatus, the scanning optical element is made of a plastic material.

In the scanning optical apparatus, the optical element for synchronous detection and the scanning optical element are integrally molded by plastic injection molding.

In the scanning optical apparatus, the optical element for synchronous detection and a second optical element are integrally molded by plastic injection molding.

In the scanning optical apparatus, the scanning optical element is comprised of a refracting optical element and a diffracting optical element.

In the scanning optical apparatus, the scanning optical element effects the correction control of correcting a scanning magnification in conformity with the output of the scanning position detecting means.

In a color image forming apparatus for scanning a beam from at least one scanning optical apparatus on a plurality of image bearing members to thereby form a color image, the scanning optical apparatus comprises:

a light source;

a deflecting element for deflecting and scanning a beam emitted from the light source;

a scanning optical element for imaging the deflected beam into a spot shape on the scanned surfaces of the image bearing members; and an optical element for synchronous detection for directing the deflected beam from the deflecting element to a sensor to take the timing of image writing beginning; and is characterized in that registration detecting means for making the optical axis of the optical element for synchronous detection and the principal ray of the beam from the deflecting element coincident with each other, and detecting the positional deviation of a marking of a predetermined shape formed on each of the image bearing members by each scanning optical apparatus is provided at a position corresponding to an image height separate from the optical axis of the scanning optical element.

In the color image forming apparatus, the registration detecting means is disposed so as to be capable of detecting a plurality of image heights substantially symmetrical with respect to the optical axis of the scanning optical element.

In the color image forming apparatus, provision is made of correcting means for reducing absolute registration deviation in each scanning optical apparatus or registration deviation relative to the scanning optical apparatus providing the reference, in conformity with the output of the registration detecting means.

In the color image forming apparatus, the registration detecting means is disposed so as to be capable of detecting two image heights substantially symmetrical with respect to the optical axis of the scanning optical element, and effects the correction control of correcting the timing of image writing beginning by an amount corresponding to $$\Delta A = K \times (\Delta 1 + \Delta 2)/2,$$

where $\Delta 1$ is the amount of registration deviation at a first image height, $\Delta 2$ is the amount of registration deviation at a second image height, and K is a constant.

In the color image forming apparatus, the registration detecting means is disposed so as to be capable of detecting two image heights substantially symmetrical with respect to the optical axis of the scanning optical element, and effects the correction control of correcting the scanning magnification by an amount corresponding to $$\Delta A' = K' \times (\Delta 1 - \Delta 2)/2,$$

where $\Delta 1$ is the amount of registration deviation at a first image height, $\Delta 2$ is the amount of registration deviation at a second image height, and K' is a constant.

In an image forming-apparatus for scanning a beam from at least one scanning optical apparatus on a plurality of image bearing members to thereby form an image, the scanning optical apparatus comprises:

a light source;

a deflecting element for deflecting and scanning a beam emitted from the light source;

a scanning optical element for imaging the deflected beam into a spot shape on the scanned surfaces of the image bearing members; and an optical element for synchronous detection for directing the deflected beam from the deflecting element to a sensor to take the timing of image writing beginning; and is characterized in that registration detecting means for making the optical axis of the optical element for synchronous detection and the principal ray of the beam from the deflecting element for taking the timing of image writing beginning coincident with each other, and detecting the positional deviation of a marking of a predetermined shape formed on each of the image bearing members by each scanning optical apparatus is provided at a position corresponding to an image height separate from the optical axis of the scanning optical element.

An image forming apparatus comprises the first-described scanning optical apparatus and a printer controller for converting code data inputted from an outside apparatus into an image signal and inputting it to the scanning optical apparatus.

A color image forming apparatus comprises the scanning optical apparatus described in the above-described color image forming apparatus, and a printer controller for converting code data inputted from an outside apparatus into an image signal and inputting it to the scanning optical apparatus.

An image forming apparatus comprises the scanning optical apparatus described in the above-described image forming apparatus, and a printer controller for converting code data inputted from an outside apparatus into an image signal and inputting it to the scanning optical apparatus.

The action and effect of the present invention are such that the optical surface of the optical element for synchronous detection is right opposed to a BD beam for detecting a horizontal synchronizing signal, that is, the optical axis of the optical element for synchronous detection and the principal ray of the BD beam are made substantially coincident with each other, whereby the BD beam becomes free from the influence of chromatic aberration of magnification. Also, the chromatic aberration of magnification of the scanning optical system becomes zero on the axis of the scanning optical system, i.e., substantially at the center of the scanning width. Consequently, the on-axis beam substantially at the center of the scanning width which is in predetermined delayed relationship with the BD beam becomes free from the influence of chromatic aberration of magnification, and does not cause pixel deviation.

Further, if the positional fluctuation of the beam of one or more image heights except at the center of the scanning width is detected, it can be regarded as the fluctuation of the off-axis beam relative to the immovable on-axis beam and therefore, this can be processed as the fluctuation of the scanning magnification or the registration deviation by chromatic aberration of magnification. The processing calculation is done by means of a simple arithmetic expression as described above. Depending on the result of the calculation, timely correction can be applied to thereby achieve a reduction in registration.

DESCRIPTION OF THE PREFERRED EMBODIMENTS

Some embodiments of the present invention will hereinafter be described in detail with reference to the drawings.

First Embodiment

Figure 1:
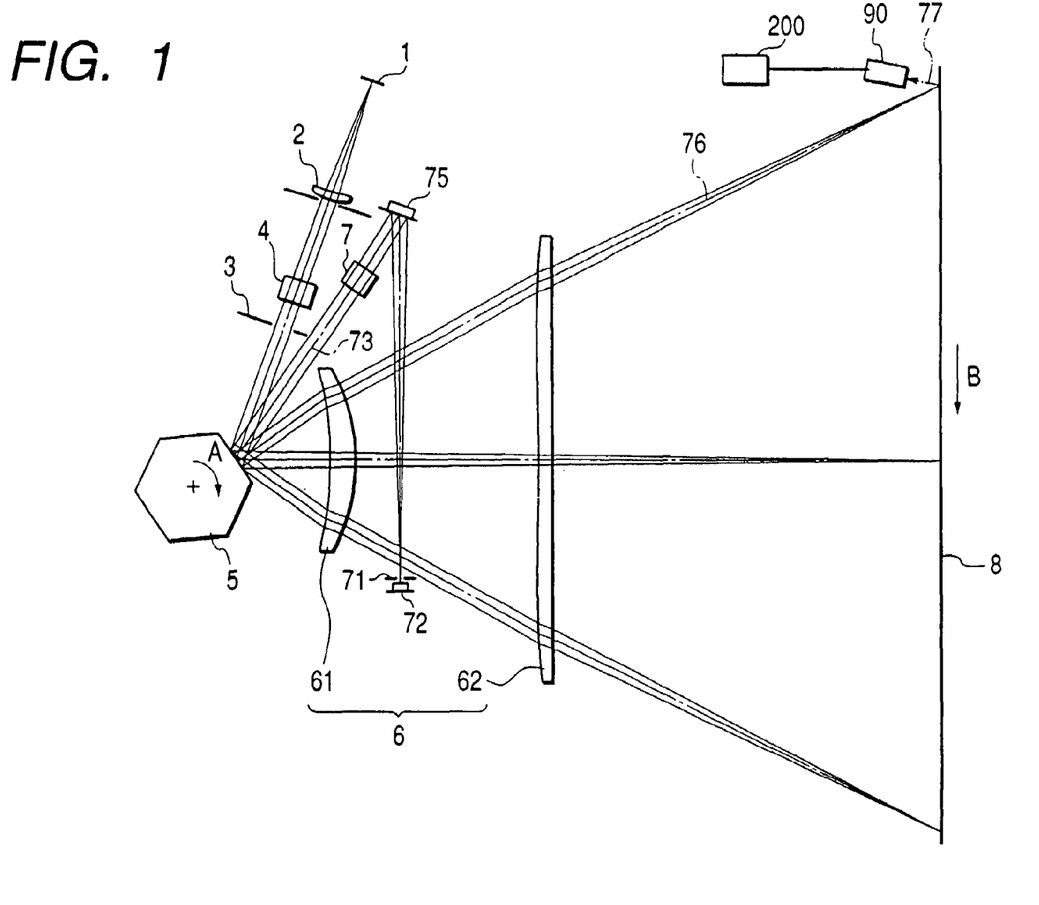
FIG. 1 is a cross-sectional view of a scanning optical apparatus according to a first embodiment of the present invention in the main scanning direction.

FIG. 1 is a cross-sectional view of a scanning optical apparatus according to a first embodiment of the present invention in the main scanning direction.

In FIG. 1, the reference numeral 1 designates light source means modulated by an image signal and comprising, for example, a semiconductor laser (LD). The reference numeral 2 denotes a collimator lens for converting the beam from the light source means 1 into parallel beams. The reference numeral 3 designates a stop for limiting the parallel beams from the collimator lens 2 to a beam (or a predetermined quantity of light) having a predetermined cross-sectional shape. The reference numeral 4 denotes a cylinder lens for condensing the beam into a linear beam.

The reference numeral 5 designates a light deflector comprising a polygon mirror and rotated in the direction of arrow A by driving means such as a motor, not shown. The reference numeral 6 denotes a scanning optical system having an fθ characteristic. The reference numeral 7 designates an optical element for synchronous detection (BD lens). The reference numeral 8 denotes a photosensitive drum which is a scanned surface.

A divergent beam emitted from the semiconductor laser 1 which is light source means is converted into substantially parallel beams by the collimator lens 2. These beams have their quantities of light limited by the stop 3, and enters the cylinder lens 4. Of these beams, the beam in the main scanning direction is intactly incident on the polygon mirror 5 which is a light deflector, while the beam in the sub-scanning direction is imaged near the surface of the polygon mirror. Accordingly, the beam incident on the polygon mirror 5 becomes a linear image long in the main scanning direction. The beam incident on the polygon mirror 5 which is a light deflector is deflected and scanned in the main scanning direction by the rotation of the polygon mirror 5 in the direction of arrow A by the motor.

The beam deflected by the polygon mirror 5 enters the scanning optical element 6 which is an fθ lens comprising a refracting optical element and a diffracting optical element. In the present embodiment, a plastic toric lens 61 and a long diffracting element 62 are disposed on the polygon mirror 5 side with respect to the midpoint of the rotary shaft of the polygon mirror 5 and the scanned surface 8. The long diffracting element 62 is made of plastic made by injection molding, but an equal effect will be obtained even if a diffraction grating is made on a glass substrate by replica. These optical elements 61 and 62 have different powers mainly in the main scanning direction and the sub-scanning direction, and cause the deflected beam from the polygon mirror 5 to be imaged on the scanned surface and also correct the tilt of the surface of the polygon mirror 5. The beam having emerged from the scanning optical element 6 is imaged on the scanned surface 8, and the scanned surface 8 comprising a photosensitive member such as a photosensitive drum or the like is scanned in the direction of arrow B by this beam. The photosensitive member such as a photosensitive drum is exposed to this beam, and an image is transferred to transfer paper by way of the known electrophotographic process, thereby forming an image conforming to an image signal inputted to the semiconductor laser 1.

On the other hand, a part (synchronous detection beam) 73 of the beams deflected by the polygon mirror 5 enters the optical element 7 for synchronous detection. These beams are converged in both of the main scanning and the sub-scanning by the anamorphic power of this element through a reflecting mirror 75, and are imaged and scanned near a slit 71 for synchronous detection, and enter a sensor 72 for synchronous detection and produce a synchronizing signal in the main scanning direction.

In the present embodiment, the optical element 7 for synchronous detection singly molded of a plastic material is disposed so that the lens surface thereof may be substantially right opposed to the synchronous detection beam 73. That is, the optical axis of the optical element 7 for synchronous detection and the principal ray of the synchronous detection beam 73 are made substantially coincident with each other. Accordingly, as shown in FIG. 1, even if the wavelength of the laser source 1 is changed, for example, by the mode hop by temperature rise, chromatic aberration of magnification is not produced in the optical element 7 for synchronous detection and therefore, the timing of a writing beginning synchronizing signal does not change. Also, even if the refractive index of the optical element 7 for synchronous detection is changed by a change in the environment, the timing of the writing beginning synchronizing signal likewise does not change.

On the other hand, in an image area, if the light source wavelength which is the wavelength of the laser source 1 is changed by a change in the environment such as temperature, humidity and atmospheric pressure of the mode hop or the like by temperature rise, the arrival positions of the beams on the scanned surface coincide with each other only on the optical axis of the scanning optical element, and causes a change in magnification symmetrically on the opposite sides of the optical axis at the other points. This also holds true in the case of the change in refractive index by the fluctuation of the environment.

Figure 4:
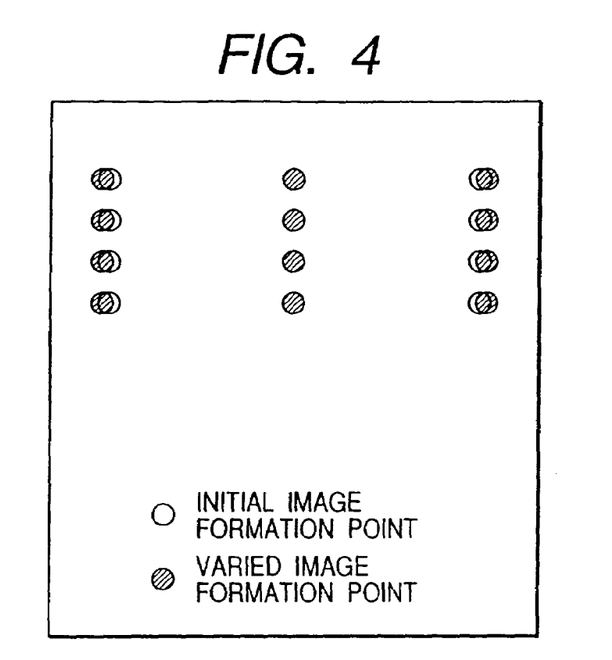
FIG. 4 is an output sample by the scanning optical apparatus according to the first embodiment of the present invention and shows the state of the magnification deviation in the main scanning direction.

That is, the timing of synchronous detection does not change for the change in refractive index by the change in the wavelength or the change in the environment, and the imaged position on the image area changes symmetrically with respect to the optical axis of the scanning optical element and thus, as shown in FIG. 4, the amount of change in magnification comes to be produced while being put in two on the writing beginning side and the writing ending side.

So, as shown in FIG. 1, the scanning position of an off-axis beam 76 of one-side image height in the main scanning direction on the drum is monitored by scanning position detecting means 90, whereby any change in the scanning magnification (any change in the length of the scanning width) can be detected. In the present embodiment, the scanning position detecting means 90 is of a type in which the reflected light 77 of a beam 76 on the scanned surface 8 is received and detected, whereas it is not restricted to the type of FIG. 1, but may use other known method, for example, a method of monitoring an image embodied by the electrophotographic process.

The scanning position detecting means will hereinafter be described in detail.

The scanning position detecting means 90 uses a construction in which for example, a predetermined position on the scanned surface 8 (a predetermined image height for measuring the scanning position) and a line CCD (a CCD in which pixels are disposed in a linear state) are disposed in conjugate relationship by an imaging lens and the direction of arrangement of the line CCD is substantially coincident with the scanning direction of the scanning beam. Thereby, the off-axis beam of a predetermined image height having arrived at the scanned surface 8 is re-imaged on the line CCD through an imaging lens. An output conforming to the quantity of light received by each pixel of the line CCD is monitored, and the pixel of a maximum output or the pixel at the centroid position of the output is specified, whereby the irradiated position on the scanned surface 8 can be determined.

The scanning beam imaged image height when a predetermined time has elapsed from the timing detected by the synchronous detecting means 72 is defined as the image height of scanning position detection, and the scanning position detecting means 90 is disposed.

The laser is caused to emit light when a predetermined time has passed from the timing detected by the synchronous detecting means 72 at each scanning or a predetermined scanning interval, the irradiated position on the scanned surface 8 based on the scanning position detecting means 90 is determined by a correcting circuit 200. The case where the irradiated position on the scanned surface 8 determined at this time has a difference relative to a predetermined position is regarded as a change having been in the irradiated position, and the amount of the change is detected as the amount of fluctuation of the irradiated position.

As another scanning position detecting means 90, a light receiving element like a photodiode is disposed in conjugate relationship with a predetermined position on the scanned surface 8 (a predetermined image height for measuring the scanning position) by an imaging lens. Thereby, the off-axis beam of a predetermined image height having arrived at the scanned surface 8 is re-imaged on the light receiving element through the imaging lens. An output conforming to the quantity of light received by the light receiving element is monitored, and the timing at which a predetermined quantity of light has been reached is specified, whereby the timing at which the scanning beam has passed the irradiated position on the scanned surface 8 can be determined.

Irradiated position detecting means is provided at a particular position on the scanned surface 8.

The timing detected by the synchronous detecting means 72 and the timing detected by the scanning position detecting means 90 are measured at each scanning or at a predetermined scanning interval, and the time differential therebetween is calculated. The case where the amount of change in the time differential between the two timings calculated at this time has a difference relative to a predetermined value is regarded as a change having been in the irradiated position, and from the amount of the change and the scanning speed of the scanning beam, the amount of fluctuation of the irradiated position is calculated by a correcting circuit 200.

Next, a change in the scanning magnification detected by monitoring by the scanning position detecting means 90 can be corrected into the original magnification by the existing method described below. That is, it can be corrected into the original magnification in conformity with or in superposition on (a) changing the focal length by a zoom Fθ lens,
(b) changing the rotating speed of the polygon mirror,
(c) changing the driving frequency of LD, and
(d) changing the magnification of the image by image processing.

By correcting and controlling the scanning magnification by the existing means as described above while monitoring by the scanning position detecting means 90, the imaging point after the change of FIG. 4 can be returned to the initial imaging point. According to FIG. 4, the imaging points of the respective colors can be made coincident with one another on the main axis in the main scanning direction, and the respective color lights can be converged to such a degree that they slightly deviate from one another as they deviate to the right and left points of the main axis.

As described above, in the present embodiment, the optical element 7 for synchronous detection of the scanning optical apparatus is disposed so that the lens surface thereof may be opposed substantially right to the synchronous detection beam 73, whereby even when an inexpensive plastic-molded lens in which the correction of chromatic aberration of magnification is not effected is used as the scanning optical element, it is possible to reduce the pixel deviation of the scanning optical system 6 attributable to wavelength deviation or magnification deviation by a change in the environment.

Also, a multilaser having a plurality of light emitting points may be used as the light source in the present embodiment to thereby provide a multibeam scanning optical apparatus, and it is possible to realize a color image forming apparatus which can highly minutely cope with a higher speed.

Second Embodiment

Figure 2:
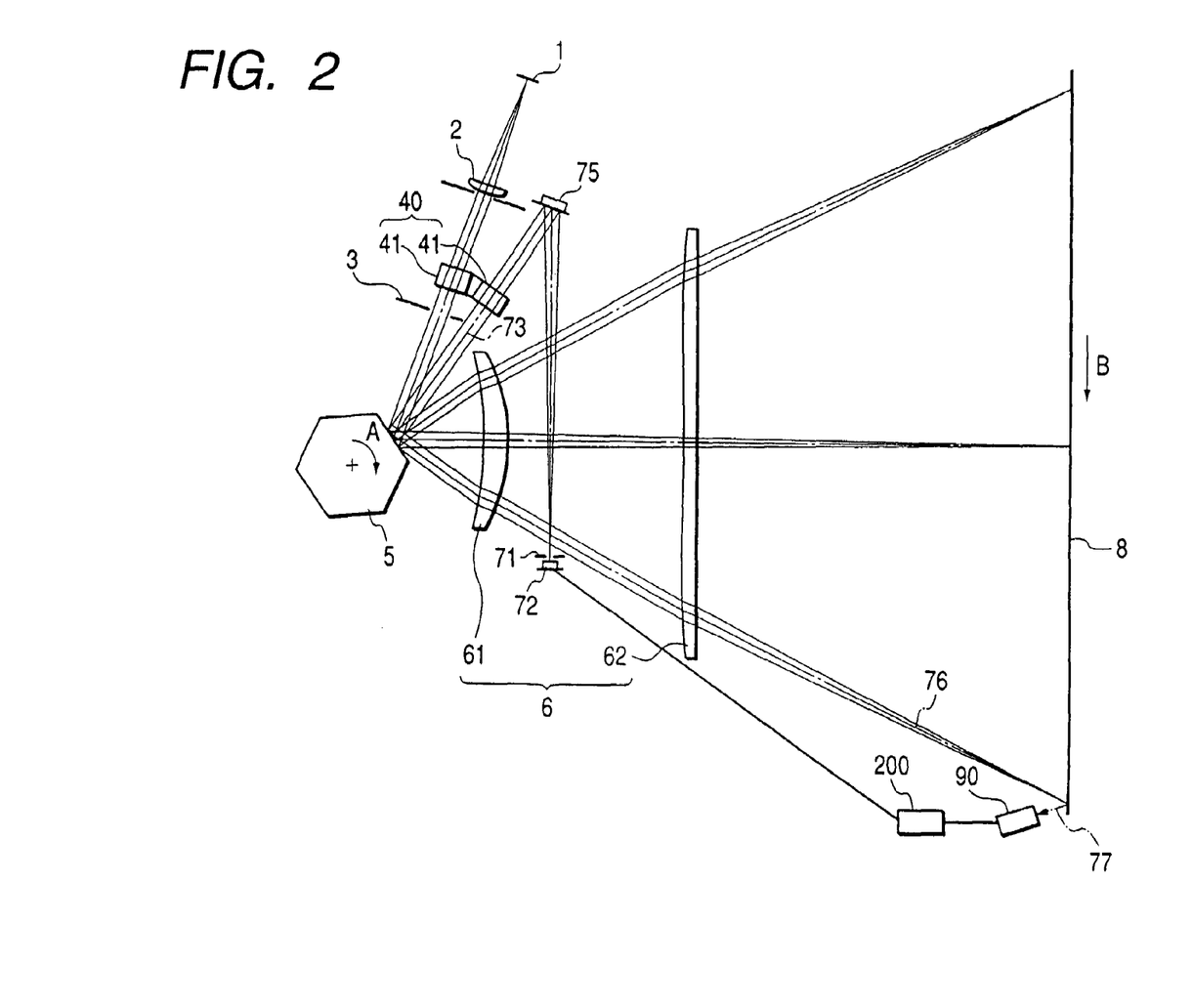
FIG. 2 is a cross-sectional view of a scanning optical apparatus according to a second embodiment of the present invention in the main scanning direction.

FIG. 2 shows the construction of a scanning optical apparatus according to a second embodiment of the present invention. In FIG. 2, the same reference numerals as those in FIG. 1 designate members similar in performance and function to those in FIG. 1.

The differences of the second embodiment from the scanning optical apparatus of the first embodiment are:

(a) that the scanning position detecting means 90 is provided at an image height downstream of the scanning area; and (b) that the cylinder lens portion 41 and the optical element portion 42 for synchronous detection are made integral with each other to thereby provide a compound lens 40.

The compound lens 40 is produced by the integral molding step using a mold, and makes a reduction in cost possible. It is also possible to suitably re-set the focal lengths of the cylinder lens portion 41 and the optical element portion 42 for synchronous detection to thereby approximate the disposition of the compound lens 40 to a scanning lens 61 and further make them integral with each other. By making the compound lens 40 and the scanning lens 61 integral with each other, the unevenness in disposition can be restrained and a contribution can be made to an improvement in performance.

In the present embodiment, as in the first embodiment, as shown in FIG. 4, a scanning position deviation occurs to putting it in two with the on-axis image height as the reference and therefore, even if the scanning position detecting means 90 is provided at the image height opposite to that in the first embodiment, any change in scanning magnification can likewise be detected.

That is, a retrace period is simply provided in a predetermined time after the detection of BD as a synchronizing signal which is the image height downstream of the scanning area of the scanning position detecting means 90 and therefore, the difference from the first embodiment is only to convert the trigger time of timing, and when there is the influence of the scanning position detecting means 90 upon the disposition of the compound lens 40, the compound lens 40 and the scanning position detecting means 90 for detecting BD at the start of the scanning retrace period may be combined together as shown in FIG. 2, but the two may be disposed discretely from each other when there is no influence upon the integral disposition of the compound lens 40.

Third Embodiment

In a third embodiment of the present invention, four scanning optical apparatuses except the scanning position detecting means 90 which are identical with the scanning optical apparatus of the first embodiment are juxtaposed in parallel to one another and are used in a tandem type color image recording apparatus for recording an image signal on photosensitive drums which are image bearing members.

Figure 3:
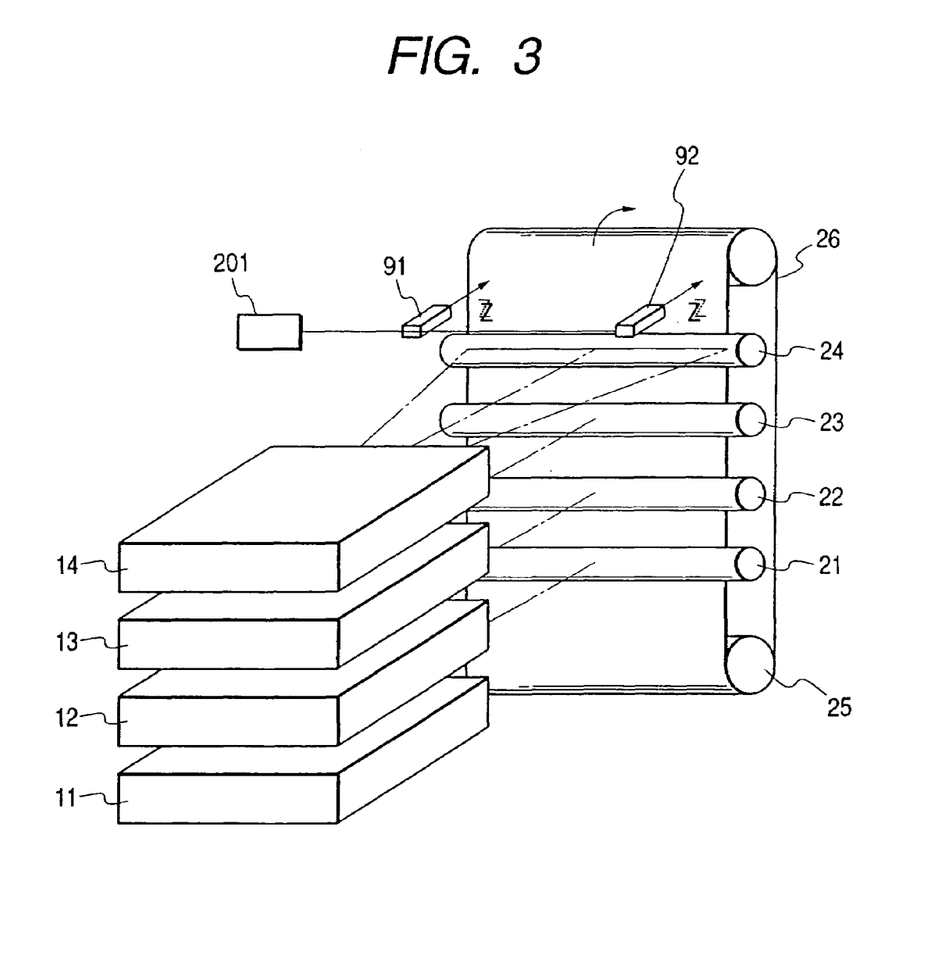
FIG. 3 shows a tandem type color image forming apparatus according to a third embodiment of the present invention.

FIG. 3 shows the above-described tandem type color image forming apparatus. Scanning optical apparatuses 11 to 14 correspond to C (cyan), M (magenta), Y (yellow) and B (black), respectively, and image information of each color is recorded on each of different photosensitive drums 21 to 24. Such a color image forming apparatus can record and print a color image at a speed as high as that for a black-and-white image, but the scanning optical apparatuses are not used in common for the respective colors and therefore, there is the drawback that the scanning line positions (registration) among the colors are liable to deviate and color deviation is liable to occur.

In the present embodiment, in the scanning optical apparatuses used in the tandem type color image forming apparatus, as in the first embodiment, the optical element 7 for synchronous detection singly molded of a plastic material is disposed so that the lens surface thereof may be opposed substantially right to the synchronizing detection beam 73.

Accordingly, as in the first embodiment, even if for example, the light source wavelength among the four scanning optical apparatuses changes, the timing of the writing beginning synchronizing signal does not change, and even if the refractive index of the optical element for synchronous detection is changed by a change in the environment, the timing of the writing beginning synchronizing signal likewise does not change.

On the other hand, in the image area, when the light source wavelength among the four scanning optical apparatuses changes, the arrival positions of the beams on the scanned surface 8 coincide with each other only on the optical axis of the scanning optical element and at the other points, a change in magnification occurs symmetrically on the opposite sides of the optical axis (this also holds true in the case of a change in refractive index by the fluctuation of the environment).

Figure 5:
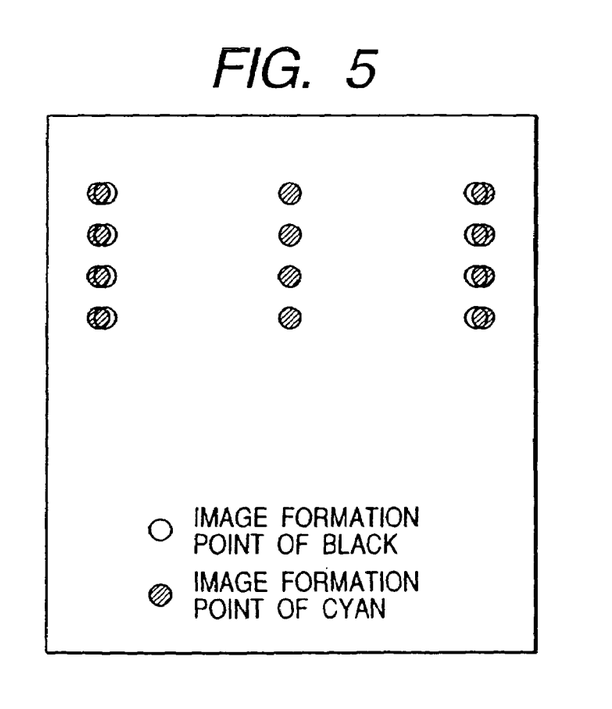
FIG. 5 is an output sample by the tandem type color image forming apparatus according to the third embodiment of the present invention, and shows the state when color deviation has been caused by the magnification deviation in the main scanning direction.

That is, the synchronous detection timing does not change for the change in refractive index by a change in wavelength or a change in the environment, and the imaged position on the image area changes symmetrically with respect to the optical axis of the scanning optical element and therefore, as shown in FIG. 5, an amount of color deviation occurs with the amounts of magnification change of each color put in two on the writing beginning side and the writing ending side. According to FIG. 5, as in FIG. 8, the image formation points of cyan (C) and the image formation points of black (B) coincide with each other at the central position on the optical axis, but on the upper left side of the scanning starting point and the upper right side of the end point, the image formation points of cyan (C) deviate more outwardly than the image formation points of black (B). This deviation may equally occur for four colors including M (magenta) and Y (yellow), but the deviation between the image formation points is small because the image formation points are made coincident with each other on the optical axis.

The detection of the amount of deviation of this scanning line position (registration) among the colors is effected as follows. A predetermined marking (Z in FIG. 3) is provided at symmetrical off-axis image heights and image information for each color is recorded as a latent image on each of the different photosensitive drums 21 to 24 by each of the four scanning optical apparatuses. Next, the latent image is visualized on a conveying belt 26 by an electrophotographic process apparatus, not shown. The amount of deviation of the registration is detected by registration detecting means 91 and 92 from the marking visualized on the conveying belt which has passed the four photosensitive drums. When the deviation of registration is to be detected, predetermined markings may be arranged for the respective colors at predetermined intervals in the conveying direction of the belt (the sub-scanning direction).

Here, the registration detecting means refers to detecting means for detecting the scanning line position (registration), and the registration deviation refers to the deviation of the scanning line position (registration) in the main scanning direction.

The registration detecting means will hereinafter be described in detail.

The construction of the registration detecting means 91 and 92 comprises illuminating means for illuminating the marking visualized on the conveying belt 26, and marking position detecting means for detecting the position of the marking.

The illuminating means is an illuminating optical device for illuminating the marking portion by an emitted beam from a light source such as an LED through the intermediary of a reflector or a condensing lens.

Also, as the marking position detecting means, use can be made of the scanning position detecting means 90 in the first or second embodiment. That is, for the detection of the marking position, use in made of a construction in which, like the scanning position detecting means 90, a line CCD (a CCD in which pixels are arranged in a straight line) is disposed in conjugate relationship with the position the marking on the conveying belt 26 passes (a predetermined image height for measuring the scanning position) by an imaging lens and the arrangement direction of the line CCD is made substantially coincident with the scanning direction of the scanning beam. Thereby, the marking illuminated by the illuminating means is imaged on the line CCD through the imaging lens. An output conforming to the quantity of light received by each pixel of the line CCD is monitored, and the pixel at the centroidal position of the output is specified, whereby the position of the marking in the main scanning direction can be determined. As the method of determining the position of the marking, utilization may be made of any other known method than a method of specifying the pixel at the centroidal position of the CCD output. When the positions of the markings of the respective colors Y, M, C and K are individually detected and there is a relative difference among them, it is regarded as the registration deviation occurring, and the amount of the relative difference is detected as the amount of registration deviation by a correction circuit 201.

If the amount of registration deviation exceeds a predetermined amount (which is usually said to be 0.1 mm in the case of an A4 format printer), it is considered to be a problem as a degradation in the quality of a color image. A correcting method therefor will be described below.

When the amount of registration deviation detected by the registration detecting means 91 is defined as $\Delta 1$ and the amount of registration deviation detected by the registration detecting means 92 is defined as $\Delta 2$ and constants are K and K', the amount $\Delta A$ of correction of the deviation of writing beginning timing is obtained by effecting the correction control of delaying the writing beginning timing by an amount corresponding to $$\Delta A = K \times (\Delta 1 + \Delta 2)/2,$$

and the amount $\Delta A'$ of correction of the deviation of the scanning magnification is obtained by effecting the correction control of correcting the scanning magnification by an amount corresponding to $$\Delta A' = K' \times (\Delta 1 - \Delta 2)/2.$$

The details of the method of correcting the scanning magnification are similar to those in the first embodiment. That is, the scanning magnification can be corrected by adopting one of the following steps or mixing the following steps together: (a) changing the focal length by a zoom F (H) lens; (b) changing the rotational speed of the polygon mirror; (c) changing the driving frequency of LD; and (d) changing the magnification of the image by image processing.

Also, the constants K and K' are usually "1", but there is a case where they do not always become "1" due to such factors as the elongation of image transferring paper and the individual difference of the apparatus, and they can be set timely.

The constants K and K' will hereinafter be described in detail.

K and K' usually are 1. At this time, $\Delta A$ is the simple average of $\Delta 1$ and $\Delta 2$ and therefore is indicative of the amount of deviation of the irradiated position of the central one of the image heights being monitored by the two registration detecting means. Also, $\Delta A'$ becomes a half of the difference between $\Delta 1$ and $\Delta 2$, and is indicative of a half of the change in the interval between the image heights being monitored by the two registration detecting means 91 and 92, i.e., a half of the change in the scanning magnification (scanning width).

On the other hand, K and K' need not always be 1 if $\Delta A'$ is within the allowable range of the deviation of registration. The allowable range of the deviation of registration is varied by the designed apparatus or the outputted image and therefore cannot be defined unconditionally. On the other hand, among the colors Y, M, C and K, some are apt to be conspicuous in the deviation of registration and some are hard to be conspicuous in the deviation of registration. The allowable range is wide for the colors hard to be conspicuous in the deviation of registration and therefore, it is not always necessary to precisely correct the calculated amount of registration deviation, but yet for the colors apt to be conspicuous in the registration deviation, it is desirable to approximate K and K' to 1.

Also, as another case, it is desirable to timely set K and K' to other constants than 1 correspondingly to the expansion and contraction or conveyance of image transferring paper. Images of the respective colors Y, M, C and K are successively transferred to the image transferring paper, but the transferring paper itself is expanded or contracted by the fluctuation of the pressure and temperature it receives in the meantime. As the result, the transferred image is expanded or contracted by an amount corresponding to some magnification (the magnification deviates). Also, the transferring paper causes so-called zigzag conveyance in which it deviates in a direction perpendicular to the direction of movement thereof when the images of the respective colors Y, M, C and K are successively transferred to the transferring paper. At this time, it becomes necessary to stagger the writing beginning timing to thereby provide the registration deviation of the colors Y, M, C and K.

The deviation of the writing beginning timing of $\Delta A$ occurs when the accuracy of the alignment of the centers of the scanning directions of the four scanning optical apparatuses is bad during the assembly of the color image forming apparatus or the positions of the centers of the scanning directions of the scanning optical apparatuses deviate from one another for some reason or other during the use of the color image forming apparatus.

The amount registration deviation corresponding to each color can be reduced even if with a reference color (e.g.

black) as the reference, the other colors are relatively put together or absolute amounts of deviation are put together for each color.

As described above, in the present embodiment, the optical elements for synchronous detection of the scanning optical apparatuses used in the tandem type color image forming apparatus are disposed so that the lens surfaces thereof may be opposed substantially right to the synchronous detection beam, whereby even when an inexpensive plastic molded lens in which the correction of chromatic aberration of magnification is not effected is used as the scanning optical element, it is possible to reduce the color deviation of a color image attributable to the magnification deviation by wavelength deviation or a change in the environment. Also, a multilaser having a plurality of light emitting points may be used as the light source in the present embodiment to thereby provide a multibeam scanning optical apparatus, and it is possible to realize a color image forming apparatus which can highly minutely cope with a higher speed.

Description will now be made of an image forming apparatus applied to the present invention.

Figure 9:
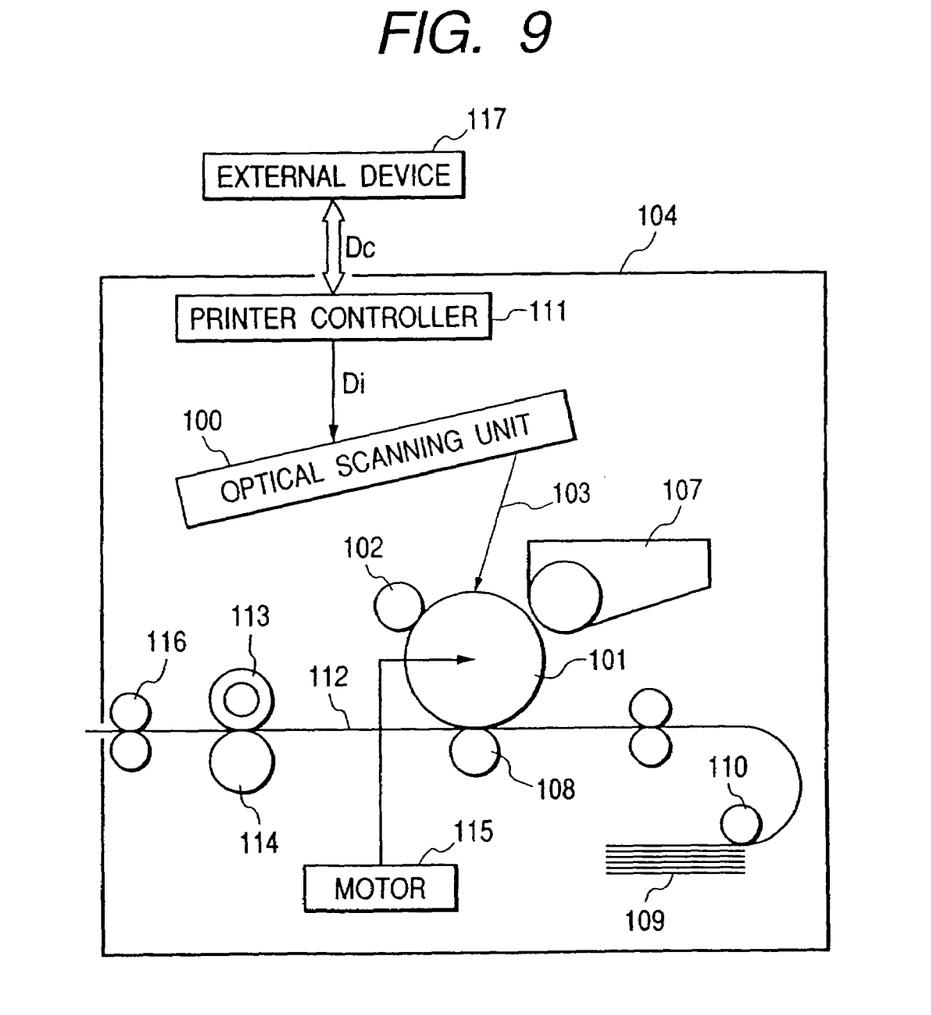
FIG. 9 is a schematic view of an image forming apparatus according to the present invention.

FIG. 9 is a cross-sectional view of the essential portions of an embodiment of the image forming apparatus of the present invention in the sub-scanning direction. In FIG. 9, the reference numeral 104 designates the image forming apparatus. Code data Dc is inputted from an outside apparatus 117 such as a personal computer to this image forming apparatus 104. This code data Dc is converted into image data (dot data) Di by a printer controller 111 in the apparatus. This image data Di is inputted to an optical scanning unit 100 having the construction shown in Embodiments 1 to 3. A light beam 103 modulated in conformity with the image data Di is emitted from the optical scanning unit 100, and the photosensitive surface of a photosensitive drum 101 is scanned in the main scanning direction by this light beam 103.

The photosensitive drum 101 which is an electrostatic latent image bearing member (a photosensitive member) is clockwisely rotated by a motor 115. With this rotation, the photosensitive surface of the photosensitive drum 101 moves in the sub-scanning direction orthogonal to the main scanning direction, relative to the light beam 103. Above the photosensitive drum 101, a charging roller 102 for uniformly charging the surface of the photosensitive drum 101 is provided so as to contact with the surface of the photosensitive drum. The light beam 103 scanned by the optical scanning unit 100 may be applied to the surface of the photosensitive drum 101 charged by the charging roller 102.

As previously described, the light beam 103 is modulated on the basis of the image data Di, and by this light beam 103 being applied to the surface of the photosensitive drum 101, an electrostatic latent image is formed thereon. This electrostatic latent image is developed as a toner image by a developing device 107 disposed so as to abut against the photosensitive drum 101 downstream of the applied position of the light beam 103 with respect to the rotational direction of the photosensitive drum 101.

The toner image developed by the developing device 107 is transferred onto paper 112 which is a transferring material by a transferring roller 108 disposed below the photosensitive drum 101 so as to be opposed to the photosensitive drum 101. The paper 112 is contained in a paper cassette 109 forward (on the right side as viewed in FIG. 9) of the photosensitive drum 101, and can also be manually fed. A paper feeding roller 110 is disposed on one end portion of the paper cassette 109, and feeds the paper 112 in the paper cassette 109 to a conveying path.

The paper 112 to which the unfixed toner image has been transferred in the manner described above is further conveyed to a fixing device rearward (on the left side as viewed in FIG. 9) of the photosensitive drum 101. The fixing device is comprised of a fixing roller 113 having a fixing heater (not shown) therein, and a pressing roller 114 disposed so as to pressure-contact with the fixing roller 113, and heats the paper 112 conveyed from the transferring portion while pressing the paper 112 by the pressure contact portion between the fixing roller 113 and the pressing roller 114, thereby fixing the unfixed toner image on the paper 112. A pair of paper discharging rollers 116 are further disposed rearwardly of the fixing roller 113 and discharge the paper 112 on which the toner image has been fixed out of the image forming apparatus.

Although not shown in FIG. 9, a printer controller 111 effects not only the conversion of the aforedescribed data, but also the control of various portions in the image forming apparatus including a motor 115 and a polygon motor, etc. in the optical scanning unit which will be described later.

As described above, according to the present invention, even when an inexpensive plastic molded lens in which the correction of chromatic aberration of magnification is not effected is used as the scanning optical element, it is possible to reduce the deviation of the scanning magnification of the scanning optical system by the deviation of magnification attributable to the wavelength deviation between the light sources and the fluctuation of the environment, or the registration deviation of the scanning optical system in the tandem type color image forming apparatus, and realize a scanning optical apparatus which is low in cost and easy to construct and is small in jitter and color deviation, and a color image forming apparatus using the same.

What is claimed is:

1. A scanning optical apparatus, comprising;
   a light source;
   a deflecting element for deflecting and scanning a beam emitted from said light source;
   an imaging optical element for imaging the beam deflected by a deflection surface of said deflecting element as a spot image on a scanned surface;
   a sensor for synchronous detection, for detecting the beam deflected by the deflection surface of said deflecting element as a synchronization signal for determining an image writing beginning position of the beam on the scanned surface; and
   an optical element for synchronous detection, arranged in an optical path between the deflecting surface of said deflecting element and said sensor for synchronous detection,
   wherein the beam deflected by the deflection surface of said deflecting element is directed to said sensor for synchronous detection without passing through said imaging optical element,
   wherein an optical axis of said optical element for synchronous detection and a principal ray of the beam deflected by the deflection surface of said deflecting element in entering said sensor for synchronous detection are coincident with each other, and
   wherein an irradiated position detecting means is arranged on only one side of an image writing end position of the beam, taking the optical axis of said imaging optical element as a center, so that with respect to an irradiated position of the beam deflected by the deflection surface of said deflecting element and imaged by said imaging optical element on the scanned surface, said irradiated position detecting means detects the irradiated position of the beam on the scanned surface in a main scanning direction; and wherein a correction to magnification of the imaged beam in the main scanning direction is determined based on a position signal from said irradiation position detecting means.

2. An image forming apparatus comprising a scanning optical apparatus according to claim 1, and a printer controller for converting code data inputted from an external apparatus into an image signal and inputting it to said scanning optical apparatus.

3. A scanning optical apparatus according to claim 1, further comprising a correcting circuit for determining an amount of fluctuation of the irradiated position of the beam on the scanned surface, wherein said irradiated position detecting means detects the beam which has been emitted from said light source when a predetermined time has passed after said sensor for synchronous detection detects the beam deflected by the deflection surface of said deflecting element as a synchronization signal, and said correcting circuit determines the amount of fluctuation of the irradiated position of the beam on the scanned surface detected by said irradiated position detecting means.

4. A scanning optical apparatus according to claim 1, further comprising a correcting circuit for determining an amount of fluctuation of the irradiated position of the beam on the scanned surface, wherein based on a time differential between a timing when said sensor for synchronous detection detects the beam deflected by the deflection surface of said deflecting element as a synchronization signal and a timing when said irradiated position detecting means detects the beam emitted from said light source, said correcting circuit determines the amount of fluctuation of the irradiated position of the beam on the scanned surface.

* * * * *